Nov. 14, 1961  C. O. WAGNER  3,008,644
SLIDING JOINT FOR RAILWAY SYSTEM
Filed June 17, 1959  2 Sheets-Sheet 1
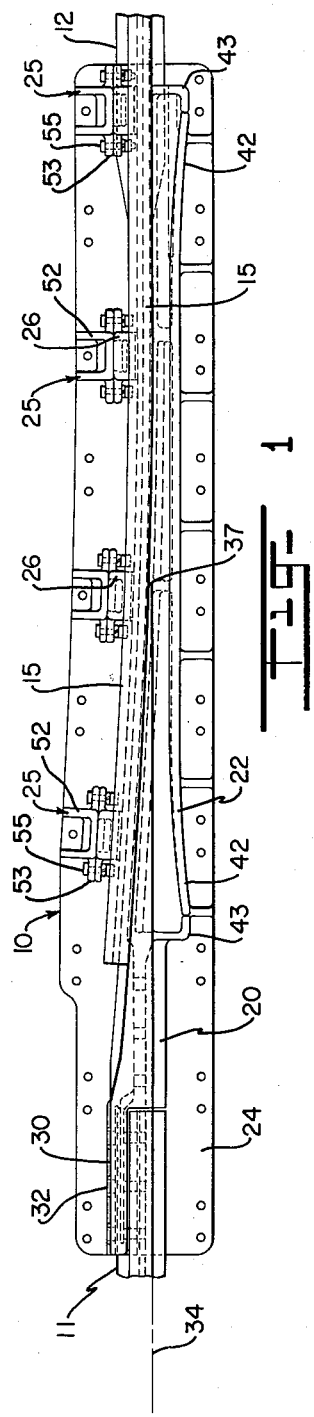
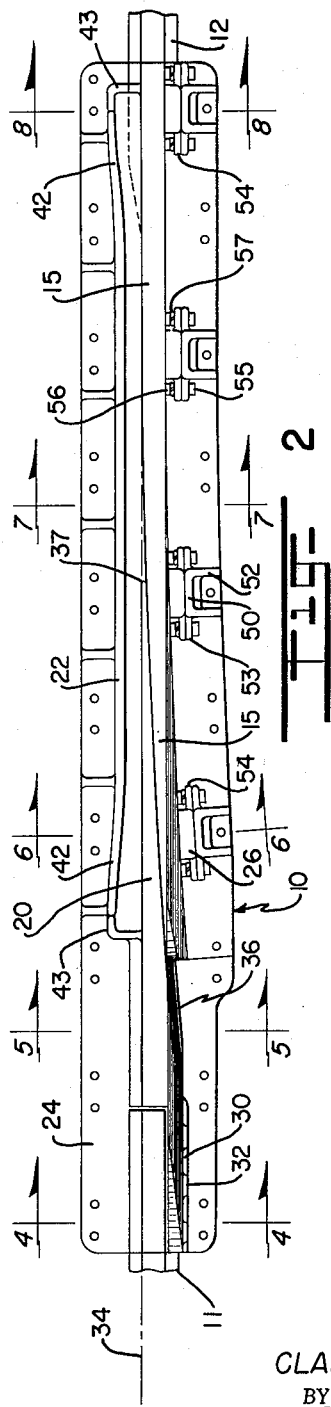
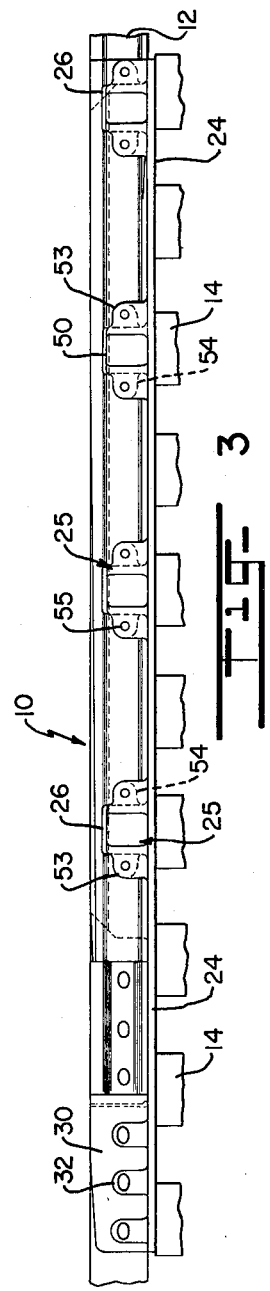
INVENTOR.
CLARENCE O. WAGNER
BY
John E. Reilly
ATTORNEY Nov. 14, 1961  C. O. WAGNER  3,008,644
SLIDING JOINT FOR RAILWAY SYSTEM
Filed June 17, 1959  2 Sheets-Sheet 2

INVENTOR.
CLARENCE O. WAGNER
BY
John E. Reilly
ATTORNEY

United States Patent Office 3,008,644
Patented Nov. 14, 1961

3,008,644
SLIDING JOINT FOR RAILWAY SYSTEM
Clarence O. Wagner, Memphis, Tenn., assignor to Conley Frog and Switch Co., Memphis, Tenn., a corporation of West Virginia
Filed June 17, 1959, Ser. No. 820,967
7 Claims. (Cl. 238—171)

This invention relates to a sliding joint for rails, such as for a monorail, or for a single or multiple track system, and is more particularly related to a sliding joint adaptable for use at the ends of welded rail sections, together with a method of joining the adjacent ends of welded rail sections together so as to permit expansion and contraction therebetween.

An important consideration in the laying or repair of track is to provide for some expansion and contraction between the rail sections forming the track and in a way so as not to make the rail sections unduly rigid nor subject to severe stresses. At the same time, it is desirable to provide for the smooth transfer of the wheels of railway vehicles from section to section while allowing for some relative movement between sections, and especially where the ends of the sections are located at approaches to bridges, on trestles, or on curves.

It is accordingly a principal object of the present invention to provide for contraction and expansion between rail sections in a track at any desired point therealong and in such a way as to greatly minimize stresses in the track while providing for the smooth transfer of the wheel load across the rail end sections with minimal impact.

It is another object to provide for a sliding joint adaptable for interconnection of adjacent ends of welded rail sections which is formed of a minimum number of parts, is very economical to produce and assemble, and is rugged and dependable in use.

It is a further object to provide for a sliding joint member which may be integrally formed to provide a rugged and continuous structure underlying the principal elements to be joined, and further wherein the integrally formed joint member is so constructed and arranged as to enable the transfer of the wheel load from one element to the other with minimal impact and pounding of the rolling equipment.

It is still a further object to provide for an integrally cast, sliding joint member conformable for use in the interconnection of rail sections, such as at approaches to bridges or on trestles or curves, which enables substantial savings in cost of manufacture and assembly, requires a minimum of maintenance and repair, and is long lasting; and moreover, is so constructed and arranged as to provide for a common support for the various elements of the joint and enables maintenance of a constant track gauge throughout the joint while providing for unlimited expansion and contraction of one end of a rail section with respect to the other.

It is an additional object to provide for a method of joining together the ends of rail sections so as to provide for maximum expansion and contraction therebetween, together with a constant track gauge throughout the joined end portions to thereby establish a smooth transfer of the wheel load from one rail section to another and at any desired point along the track.

In accordance with the above and other objects and advantages of the present invention, a more complete understanding thereof may be gained from the following detailed description taken together with the accompanying drawings, in which:

FIGURE 1 is a top plan view of a sliding joint illustrating a preferred manner of employing the joint to connect adjacent ends of welded rail sections together, in accordance with the present invention;

FIGURE 2 is a top plan view of a sliding joint similar to that of FIGURE 1, adapted for connection of the end of rail sections forming the opposite hand of the track;

FIGURE 3 is a side elevational view of the sliding joint shown in FIGURE 2;

Figure 4:
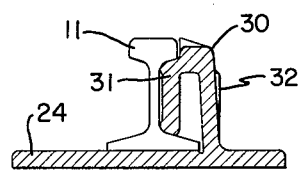
FIGURE 4 is a cross sectional view taken on line 4—4 of FIGURE 2.
Figure 5:
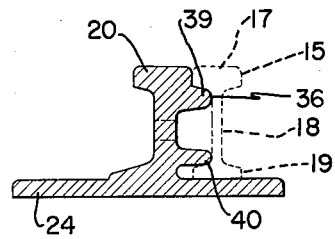
FIGURE 5 is a cross sectional view taken on line 5—5 of FIGURE 2.
Figure 6:
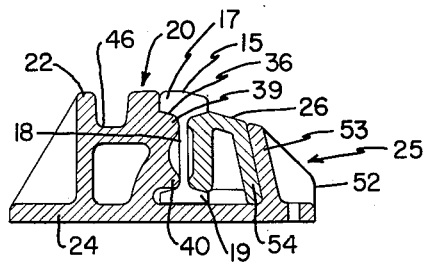
FIGURE 6 is a cross sectional view taken on line 6—6 of FIGURE 2.

As a setting, the present invention will be described in conjunction with the joining of adjacent ends of welded rail sections either for a single or double track system. The welded rail sections are generally formed in an assembly line setup whereby the lengths of rail are pressure welded together into lengths on the order of 1400 feet and thereafter hauled to the site of the track laying operation. Of course the lengths of the rail sections may vary considerably, but it will be apparent that the sections will be subject to considerable expansion and contraction, especially at critical locations.

With more particular reference to the drawings, there is shown by way of illustrative example in the figures the manner in which adjacent ends of the welded rail sections, for example, are joined together by means of a sliding joint 10, constructed in accordance with the present invention. In the drawings, the rail sections to be joined are comprised of conventional T rails and the adjacent ends of the rail sections are indicated at 11 and 12 respectively. Although not shown, in accordance with conventional practice the rail sections are mounted on ties strung at spaced intervals along the track with the joint 10 interposed between the adjacent ends and also mounted on ties 14. The end 11 overlaps one end of the joint 10 only a very slight distance to form an abutting end portion, whereas the end 12 overlaps the sliding joint 10 for the greater distance thereof and this overlapping portion 15 of the end 12, commonly termed a wing rail, is curved and preferably prebent along a predetermined radius for a purpose to be hereinafter described in more detail.

In accordance with the present invention, the sliding joint 10 is broadly comprised of a rail point 20, a guard joint 22 spaced laterally from the rail point 20, and the point 20 together with the guard 22 extend into a common base flange 24 which forms a common base support member underlying both the ends 11 and 12 of the welded rail section. Also projecting upwardly from the base are support members 25 arranged at spaced intervals along one side of the base flange, together with filler blocks 26 which define spacers interposed between the faces of the support members 25 and the sides of the wing rail 15.

Figure 8:
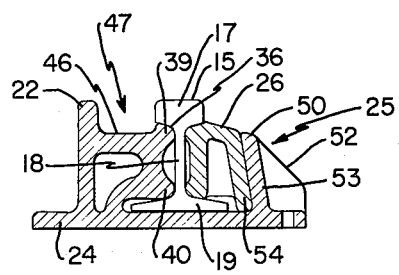
FIGURE 8 is still another cross sectional view taken on line 8—8 of FIGURE 2.

The rail point 20 forms an extension of the end 11 of one rail section and is suitably connected to the end by a rearward projection 30 having a web portion 31 which is connected to the end rail portion 11 by suitable means such as bolts 32 extending laterally through the members as shown in FIGURES 1 and 4. With the rail point 20 and end portion 11 in connected relation, it will be noted that the rail point 20 along one side thereof is aligned with the gauge line 34 of the end 11 while the opposite side of the rail point 20 tapers from the projecting end portion 30 to define an inclined bearing surface at 36 which extends forwardly past tip 37 of the rail point to the opposite end of the base flange as indicated in FIGURE 8. Throughout the length thereof the bearing surface 36 is constituted of a pair of laterally projecting portions 39 and 40. Upper projection 39 engages the side of the wing rail at the point of intersection of top flange 17 with web 18, and lower projection 40 engages the side of the wing rail at the intersection of the bottom flange 19 with the web to thereby position and hold the wing rail to a predetermined contour throughout its length.

The guard 22 forms an upstanding wall portion spaced laterally from the side of each rail point opposite the bearing surface and extends in spaced relation to the rail point 20 and wing rail 15 from a location on the base flange toward the rearward end of the rail point 20 to a location just adjacent the opposite end of the base flange. In a well known manner, the guards 22 in a double or single track system are spaced from the rail points a constant distance to prevent impact of the wheel rims of the railway vehicles from striking the rail points especially at the tips and thus the guards are spaced so as to cooperate together to prevent undue lateral shifting movement of the wheels as they move across the joint. To this end, the guards 22 of the present invention extend parallel to the gauge line throughout the intermediate portion thereof opposite the tips 37 of the rail points, then swing outwardly adjacent the ends, as indicated at 42, and terminate in downwardly inclined wall portions 43. Forming a horizontal projection of the guard is web portion 46 which joins into the rail point, and beyond the point joins into the bearing portion 36 to form therewith a channel or guideway 47 throughout the length of the joint to permit passage of the flanges of the wheel. In this way the guard and web portion 46 serve not only to prevent impact of the wheel rims with the sides of the rail points, but also act to support the point 20 and bearing surface 36 throughout their length and thus cooperate to absorb stresses imposed by vehicles passing over the wing rail.

Figure 7:
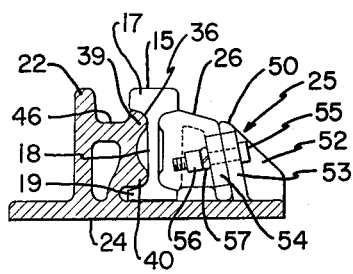
FIGURE 7 is another cross sectional view taken on line 7—7 of FIGURE 2.

Projecting upwardly along the side of the base flange opposite to the guard 22 are the support members 25 and, as illustrated, four support members 25 may be provided at spaced intervals, each including an abutment rib 50 which is aligned in a direction parallel to the direction of extension of the wing rail 15 at that location together with transverse flanges 52 and lugs 53 extending from each side of the abutment rib 50. The abutment rib 50 for each of the support members 25 is directed downwardly and outwardly to provide a slanting surface to aid in the retention of the filler blocks 26 which are inserted between the supporting members and the side of the wing rail to support the wing rail in fixed position against the bearing surface 36. In order to connect the filler blocks securely in position they are provided with corresponding lugs 54, and the lugs 53 and 54 include suitable aligned openings for insertion of bolts 55 which are held in place by means of nuts 56 and lock washers 57, as illustrated in FIGURE 7. Although the spacing between the supporting members 25 is not critical, it is greatly preferred to locate them with one supporting element opposite the wing rail adjacent to its distal end, another spaced opposite the wing rail at the tip 37 of the rail point, and with a third support member located adjacent the opposite end of the base flange; the fourth supporting member may be spaced between the second and third members as shown. In this manner, the supporting members cooperate with the bearing surface 36 to hold the wing rail along the gauge line of the track and against the side of the rail point formed by the bearing surface upon divergence away from the gauge line.

In the formation of the sliding joint 10 of the present invention, all elements, with the exception of the filler block 26, are integrally formed preferably by casting to thereby eliminate many parts and elements formerly believed to be necessary in the construction of such a joint and moreover to add greatly to its strength. Integral casting of the sliding joint is especially desirable in the construction of the point 20, guard 22 and base member 24 since, for example, in the event of cracking, particularly along the running surface of the rail point 20, the other elements forming the joint such as the guard will serve to independently support the cracked portion. Otherwise, in merely connecting the point into the base flange by means of bolts the entire safety of the joint would depend on the bolt holding the cracked portions together. Also in normal use the parts will in general enable the more direct transmission and absorption of stresses from the running surface of the point, for example, directly into the base flange and ties 14 to thereby greatly reduce strain and evenly distribute stresses throughout the joint portion. Of course, by employing a common base flange to underlie the respective ends of the rail sections, together with the integral formation of the point and guard with the base flange, the joint is capable of providing for smoother transfer of the rolling equipment across the ends of the rail section on a uniform level and with minimum shifting of the parts after extended use.

In the construction of the sliding joint of the present invention, for purposes of illustration and not limitation, the bearing surface 36 inclines and preferably curves rearwardly from the point of intersection with the gauge line 34 of the track at a very low degree of curvature which, of course, is dictated by minimum curvature of the wing rail 15 away from the gauge line while giving the rail point 20 sufficient width and strength to adequately withstand the loads imposed thereon. To serve as an example, however, the bearing surface may curve away from the gauge line on a radius which is on the order of 88 feet where the overall length of the base flange is on the order of 12 feet. To correspond with the curvature given to the bearing surface 36 the wing rail 15 is similarly prebent before assembly with the base flange so as to follow the curvature of the bearing surface when positioned in place between the filler block 26 and bearing surface 36. In assembling the parts together, the projecting end 30 may first be connected to the side of the rail end 11 by means of the bolts 32 and with the straight side of the rail point properly aligned to extend along the gauge line of the track established by the rail end portion 11. The base flange 24 may then be connected into the ties 14 again to insure that the rail point is properly aligned with the gauge line of the track. Before insertion and connection of the filler blocks 26 to the connecting members 25, the prebent wing rail 15 is positioned in place with its curved end engaging the curved portion of the bearing surface, following which the filler blocks may be inserted in place and fastened by means of the bolts 55 to the supporting means with the opposite sides of the filler block tightly engaging the side of the wing rail 15.

In use it will be noted that the wing rail is free to slide in relation to the stationary rail point as the result of any expansion or contraction encountered in the rail section. Notwithstanding any slidable movement of the wing rail 15 there will nevertheless be maintained a constant gauge along the wing rail from a point just adjacent the tip 37 toward the opposite end thereof. Thus the track gauge remains constant throughout the life of the joint and is unaffected by any sliding movement of the wing rail in response to the expansion and contraction of the rail section.

It will be apparent from the foregoing that there is provided a more effective method of joining adjacent ends of rail sections together wherein the ends are supported on a common base, one end being extended along the base and the opposite end being curved slightly away from the normal gauge and supported for slidable movement in response to expansion and contraction thereof. In addition, the method and joint construction described are conformable for numerous applications other than the preferred application as set forth. Accordingly, various changes and modifications may be made in the construction and design of the sliding joint of the present invention, together with the method as described for joining the ends of the rail sections together without departing from the scope of the present invention, as defined by the appended claims.

What is claimed is:

1. A sliding joint adapted for interposition with adjacent spaced ends of a pair of rail sections wherein one adjacent end terminates in an abutting end portion and the other adjacent end terminates in a wing rail, said joint comprising an integral casting constituted of a base flange dimensioned to underlie the adjacent ends of the rail sections, a rail point defining an upstanding projection of said base flange, said point tapering forwardly from connection to the abutting end portion of the rail section into a tip and with one side thereof defining a tapered bearing surface extending along said point and beyond the tip thereof for the greater length of the joint, the wing rail being aligned to extend along the bearing surface to form a continuation of the gauge line of the track and to curve laterally away from the gauge line in accordance with the inclination of the bearing surface for slidable contact therewith, a guard on said base flange disposed in spaced relation to the gauge line of the point and the wing rail including a web extending laterally into said point and said bearing surface, and means including a plurality of support members and separate, insertable spacers spaced at intervals therealong adjacent to the wing rail to hold the wing rail in position against the bearing surface.

2. A sliding joint adapted for interposition with adjacent spaced ends of a pair of rail sections wherein one adjacent end terminates in an abutting end portion and the other adjacent end terminates in a wing rail, said joint comprising an integral casting constituted of a base dimensioned to underlie the adjacent ends of the rail sections, a rail point on said base defining an extension of the abutting end portion, said point tapering forwardly from the abutting end portion into a tip, a bearing portion forming one side of the rail point and extending continuously throughout the length thereof thereby to reinforce said rail point while guiding the wing rail along a predetermined line of divergence away from the gauge line of the track, a guard on said base in spaced relation to said rail point, said guard including a web portion extending laterally into one side of said point opposite said bearing portion, and a plurality of support members on said base in spaced relation to said bearing portion to align a wing rail for slidable movement along said bearing portion in accordance with the expansion and contraction of the rail sections.

3. A sliding joint comprising a continuous base dimensioned to underlie adjacent spaced ends of a pair of rail sections in a track, a rail point projecting upwardly from said base and defining an extension of one adjacent end of the rail sections, said point including a tip and tapering forwardly from the one adjacent end to the tip, a bearing portion on one side of said rail point being disposed on a predetermined line of divergence away from the gauge line of the track, said bearing portion further defining a forward continuation of the tip of said rail point extending continuously along the gauge line of said track thereby reinforcing said rail point while guiding the other adjacent end of the rail section along the predetermined line of divergence away from the gauge line of the track, and supporting means spaced from said bearing portion to align the other adjacent end for slidable movement along the bearing portion in accordance with the expansion and contraction of the rail sections.

4. A sliding joint according to claim 3, said sliding joint further including a guard on said base flange being disposed in spaced relation to said rail point.

5. A sliding joint according to claim 4 wherein said guard includes a web extending laterally from said guard and said bearing portion along the gauge line of the track defines a lateral continuation of said web.

6. A sliding joint according to claim 5 wherein said bearing portion is in the form of upper and lower spaced lateral projections extending from said web and from the one side of said rail point.

7. A sliding joint according to claim 3 wherein said bearing portion is disposed on a predetermined line of curvature extending from the gauge line of the track along one side of said rail point.

References Cited in the file of this patent

UNITED STATES PATENTS

| 128,592 | Close | July 2, 1872 |
| 2,067,598 | Clarke | Jan. 12, 1937 |